June 13, 1950  C. B. SPASE  2,511,133

CLUTCH AND CLUTCH SHAFT BRAKE

Filed Oct. 16, 1948

INVENTOR.
Charles B. Spase
BY
Bodell & Thompson
ATTORNEYS

Patented June 13, 1950

2,511,133

UNITED STATES PATENT OFFICE 2,511,133

CLUTCH AND CLUTCH SHAFT BRAKE

Charles B. Spase, Nedrow, N. Y., assignor to Lipe-Rollway Corporation, Syracuse, N. Y., a corporation of New York Application October 16, 1948, Serial No. 54,989

5 Claims. (Cl. 192—18)

This invention relates to friction clutches of the type used in automotive vehicles, and has for its object an inertia brake operable during the throwing out or unclutching operation of the clutch to retard and stop the rotation of gears, shafts, etc., in the transmission line which tend to rotate under their momentum when the clutch is thrown out and thus delay and make difficult gear and clutch shifting operations. It is especially designed for heavy duty transmissions.

In automotive vehicles, particularly of the heavy duty type, the shafts and gears in the gear boxes, the propeller shafts, etc., are heavy and tend to continue rotation when the clutch is thrown out. Also, many types of gearing are of the all-in-mesh type, and the rotation under momentum is aggravated. Also, in addition to the main gear box, there is oftentimes an auxiliary gear box in the rear of the main gear box and a power take-off, parts of which rotate idly with shafts in the gear boxes, all tending to increase and maintain the momentum when the clutch is thrown out.

The feature of this invention is an inertia brake built into the throw-out mechanism and operating to first engage, during the initial part of the throw-out operation, and then through a normally idle bearing coact with the throw-out collar of the clutch mechanism to disengage the clutch, the engagement of the brake member increasing as the clutch is being thrown out or disengaged.

The invention consists in the novel features and in the combinations and constructions hereinafter set forth and claimed.

In describing this invention, reference is had to the accompanying drawings in which like characters designate corresponding parts in all the views.

Figure 1:
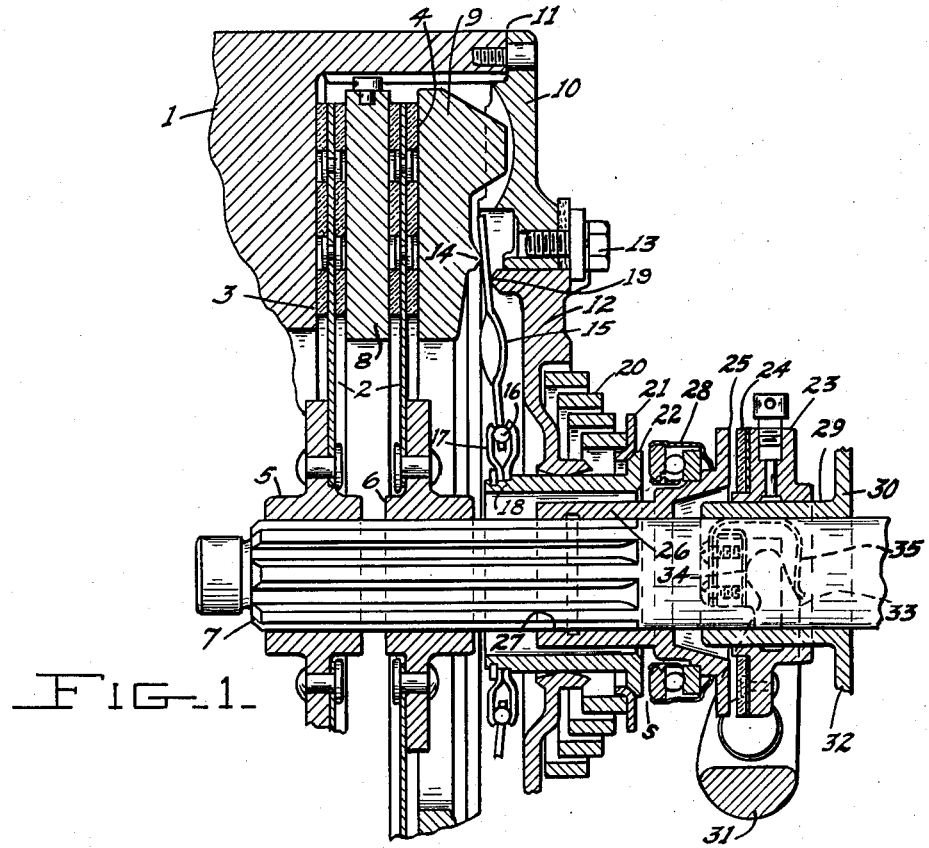
Figure 1 is a longitudinal sectional view, partly broken away, of a clutch embodying the inertia brake mechanism.
Figure 2:
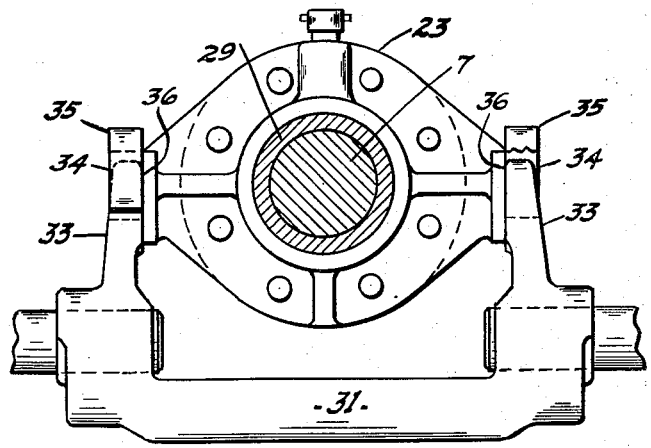
Figure 2 is an elevation of the shiftable brake member of the inertia brake and the contiguous portion of the throw-out mechanism.

The clutch here shown is of the double disk type.

1 designates the driving element of the clutch which may be the fly wheel of the engine, and 2 the driven element including members as friction plates or disks 3, 4, having their hubs 5, 6, splined on the clutch shaft 7 to slide axially thereof. The driving member includes an intermediate, pressure friction member 8 extending between the driven members 3, 4, and an outer pressure member or plate 9, the pressure members 8, 9, being connected to the fly wheel to rotate therewith in any suitable manner. The members 8, 9, are also axially shiftable.

The driven members 3, 4, are provided with friction faces on opposite sides thereof for co-acting with a friction face on the fly wheel and on the pressure plate 9, and with opposite sides of the intermediate friction member or pressure plate 8.

10 designates the back plate of the clutch bolted at its rim to the fly wheel, as at 11, and 12 designates a fulcrum carrying plate mounted on the back plate in the plane thereof between the inner edge of the back plate and the clutch shaft and adjustable axially by means of screws 13 to vary the position of its annular fulcrum 19 which coacts with clutch levers 15 relative to the fulcrum 14 on the pressure ring or member 9 to take up for wear at the friction faces. The levers 15 are here shown as pivoted at their inner ends at 16 through an annular coupling 17 to an operating or throw-out collar 18 shiftable axially of the clutch shaft 7, and act to press against an annular fulcrum 14 on the outer pressure member or plate 9. The clutch is engaged by spring means acting through the fulcrum plate 12 and the throw-out collar 18, the spring here shown being a conical spring 20 thrusting at its end of larger diameter directly against the fulcrum plate 12, and at its other end against an abutment ring 21 which thrusts against an annular flange 22 on the throw-out collar 18. The clutch construction and the operating mechanism thus far described per se form no part of this invention and as the construction and operation is well known, further description is thought to be unnecessary.

The operating mechanism, in addition to the collar 18 and levers 15, includes a throw-out yoke operated by a clutch pedal, which yoke coacts with an axially movable, non-rotatable, brake member forming the subject matter of this invention. The yoke is carried by a shaft mounted in the clutch housing, or the bell housing, of the gear box in the usual manner.

23 designates an axially shiftable, non-rotatable, brake member mounted concentric with the clutch shaft 7 and having a brake surface 24 coacting with and normally spaced from a second brake surface on an annular flange 25 provided on a sleeve 26 which is slidable axially of the clutch shaft 7 but splined thereto at 27, so as to rotate therewith. The sleeve 26 telescopes into the throw-out collar 18. A normally idle, anti-friction thrust bearing 28 is carried by the sleeve 26, and one of the races thereof is opposed to and normally spaced from the flange 22 of the throw-out flange 18, the space being indicated at S.

The non-rotatable brake member 23 is here shown as mounted on a sleeve or bearing 29 on the rear wall of the clutch housing, or the front wall 30 of the gear box, through which sleeve bearing the clutch shaft extends into the gear box.

31 designates the operating or throw-out yoke suitably mounted on a shaft journalled in the gear box or the clutch housing, the yoke having arms 33 thrusting against shoulders 34 at diametrically opposite sides of the non-rotatable brake member 23, these arms being held against looseness and rattling against the shoulders by springs 35 secured to the shoulders and pressing against the sides of the arms 33 remote from the shoulders.

The non-rotatable brake member is held from rotation by flat bearing faces 36 pressing against the flat sides of the arms 33 at diametrically opposite sides of the non-rotatable brake member 23. In other words, the yoke coacts with the brake member 23 in a way similar to a wrench coacting with a nut. The yoke 31 is usually operated by a clutch pedal, not shown.

Upon the operation of the clutch pedal, the non-rotatable brake member 23 is shifted axially to engage its clutch face first with the flange 25 of the brake member or sleeve 26, and further application of the brake by the yoke 31 shifts the sleeve 26 axially, carrying the antifriction bearing 28 against the flange 22 of the collar 18, and further operation compresses the spring 20 and operates the levers 15 to release or unclutch the clutch members 8, 9 and 3, 4. The application of the brake member first begins to retard the rotation of the shafts, gears and clutches in the gear boxes, and during continued application of force to the clutch pedal, the brake applies a heavier braking force while releasing the clutch.

What I claim is:

1. An inertia brake for clutches of the type including generally driving and driven elements comprising axially shiftable friction members, one being a pressure member, a clutch shaft on which the driven element is mounted and means operable to shift the pressure member in one direction to frictionally engage said friction members, and in the opposite direction to release the pressure member to disengage the friction members, including a throw-out collar shiftable axially of the clutch shaft, the brake comprising a non-rotatable friction member shiftable axially of the clutch shaft, a second member rotatable with the clutch shaft and shiftable axially thereof and having a bearing opposed to and spaced from the throw-out collar, and operating means to shift the non-rotatable brake member first into engagement with the second brake member and shift the bearing thereof into engagement with the collar to operate the same to release the pressure member and disengage the clutch.

2. An inertia brake for clutches of the type including generally driving and driven elements comprising axially shiftable friction members, one being a pressure member, a clutch shaft on which the driven element is mounted and means operable to shift the pressure member in one direction to frictionally engage said friction members, and in the opposite direction to release the pressure member to disengage the friction members, including a throw-out collar shiftable axially of the clutch shaft, the brake comprising a non-rotatable friction member shiftable, axially of the clutch shaft, a second member rotatable with the clutch shaft and shiftable axially thereof and having a bearing opposed to and spaced from the throw-out collar, and operating means to shift the non-rotatable brake member first into engagement with the second brake member and shift the bearing thereof into engagement with the collar to operate the same to release the pressure member and disengage the clutch, said bearing being antifriction and rotatable with the second brake member and normally spaced from the collar, whereby the bearing is normally idle.

3. An inertia brake for clutches of the type including generally driving and driven elements comprising axially shiftable friction members, one being a pressure member, a clutch shaft on which the driven element is mounted and means operable to shift the pressure member in one direction to frictionally engage said friction members, and in the opposite direction to release the pressure member to disengage the friction members, including a throw-out collar shiftable axially of the clutch shaft, the brake comprising a non-rotatable friction member shiftable, axially of the clutch shaft, a second member rotatable with the clutch shaft and shiftable axially thereof and having a bearing opposed to and spaced from the throw-out collar, and operating means to shift the non-rotatable brake member first into engagement with the second brake member and shift the bearing thereof into engagement with the collar to operate the same to release the pressure member and disengage the clutch, the operating means comprising a yoke coacting with the non-rotatable brake member to shift it axially and also to hold it from rotation.

4. An inertia brake for clutches of the type including generally driving and driven elements comprising axially shiftable friction members, one being a pressure member, a clutch shaft on which the driven element is mounted and means operable to shift the pressure member in one direction to frictionally engage said friction members, and in the opposite direction to release the pressure member to disengage the friction members, including a throw-out collar shiftable axially of the clutch shaft, the brake comprising a non-rotatable friction member shiftable, axially of the clutch shaft, a second member rotatable with the clutch shaft and shiftable axially thereof and having a bearing opposed to and spaced from the throw-out collar, and operating means comprising a yoke coacting with the non-rotatable brake member to successively shift the same into engagement with the second brake member, and the second brake member and its bearing into engagement with the throw-out collar.

5. An inertia brake for clutches of the type including generally driving and driven elements comprising axially shiftable friction members, one being a pressure member, a clutch shaft on which the driven element is mounted and means operable to shift the pressure member in one direction to frictionally engage said friction members, and in opposite direction to release the pressure member to disengage the friction members, including a throw-out collar shiftable axially of the clutch shaft, the brake comprising a non-rotatable friction member shiftable, axially of the clutch shaft, a second member rotatable with the clutch shaft and shiftable axially thereof and having a bearing opposed to and spaced from the throw-out collar, and operating means comprising a yoke coacting with the non-rotatable brake member to successively shift the same into engagement with the second brake member, and the second brake member and its bearing into engagement with the throw-out collar, the yoke also coacting with the non-rotatable brake member to hold it from rotation.

CHARLES B. SPASE.

REFERENCES CITED

The following references are of record in the file of this patent:

UNITED STATES PATENTS

| Number | Name | Date |
|---|---|---|
| 1,097,691 | Wardwell | May 26, 1914 |
| 1,590,791 | Woolson | June 29, 1926 |